July 5, 1955 R. S. MAUTNER 2,712,569

TELEVISION RECEIVER

Filed March 3, 1951

INVENTOR.
ROBERT S. MAUTNER
BY Theodore Hafner
ATTORNEY

United States Patent Office 2,712,569

Patented July 5, 1955

2,712,569

TELEVISION RECEIVER

Robert S. Mautner, Massapequa, N. Y.

Application March 3, 1951, Serial No. 213,760

2 Claims. (Cl. 178—5.8)

Figure 1:
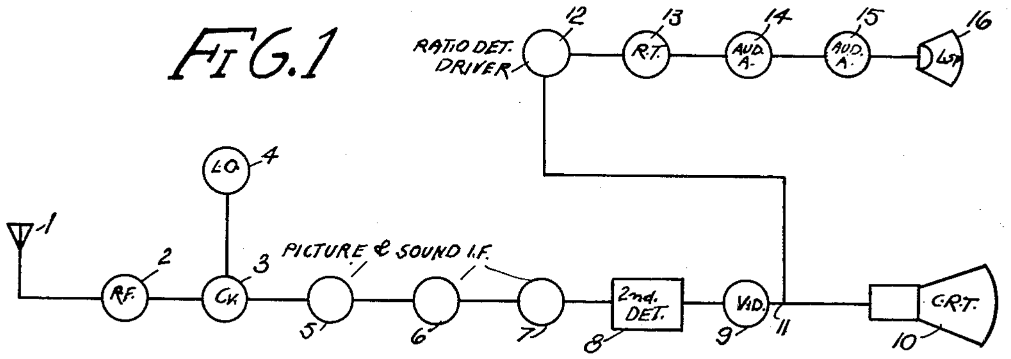

This invention relates to television receivers, especially of the intercarrier system type.

The intercarrier system of television reception which has become widely used over the past several years, depends upon the recovery of a 4.5 megacycle beat which arises as a result of the interaction of the video carrier with the sound F. M. carrier. This beat is usually obtained at the second detector of a receiver where it acts as though it were a 4.5 megacycle side band of the television picture. The beat is then passed into some form of F. M. limiter and F. M. detector or ratio detector and driver combination, which serves to recover the original audio frequency modulation. In this manner, it is possible to amplify the sound carrier along with the picture carrier in a common I. F. string, so that after the modulation process referred to above is accomplished, little further amplification of the 4.5 megacycle beat is required for sufficient sound output.

As is well known in the art, the advantages of the so-called intercarrier system are as follows:

1. Drift of the local oscillator does not change the 4.5 megacycle difference between the picture and sound carriers, and as a result receivers using this system are relatively immune to local oscillator drift.

2. A second advantage is that microphonics resulting from the impinging of sound on the oscillator tube, mechanical jars or other physical disturbances, results in frequency modulation of both picture and sound carriers simultaneously and, consequently, sets using the intercarrier principle are less susceptible to aural effects of microphonism.

However, while the system does result in the aforesaid advantages, there occur other disadvantages. For one, it is necessary to maintain a ratio of about forty to one between picture and sound carriers in their passage through the common I. F. amplifier. If the sound carrier is too low on the side of the I. F. selectivity curve, it will not receive sufficient amplification and additional amplification will have to be used at the 4.5 megacycle point. Furthermore, if an accompanying sound trap is used, the sound carrier will normally be placed at the point of maximum attenuation, and as a result slight drift of the oscillator or detuning of the fine tuning control will cause considerable variation in the amplitude of the sound carrier and, consequently, in the amplitude of the 4.5 megacycle beat.

Additional disadvantage results when the picture carrier is modulated too deeply at the transmitter. In this case a hum or buzz may result which is impossible to tune out This condition results if the heterodyning carrier (A. M. picture carrier) approaches too closely the amplitude of the sound carrier. For, in this case, the residual modulation present on the picture carrier will be transferred to the sound carrier amplitude modulating the 4.5 megacycle beat to an extent whereby the limiting section of the F. M. circuit will no longer function completely. It is for this reason that the picture carrier is kept thirty or forty times higher in amplitude than the sound carrier.

A third disadvantage to the intercarrier system results from the fact that in order to keep the respective amplitude of the two carriers in the desired ratio, it is necessary to carefully align the sets in production and to make certain that the passband does not change for regenerative or other reasons as the gain is varied in the receiver. It is also difficult to obtain the desired band width with the simple type of staggered tuning I. F. amplifier, which has come into general usage, without destroying the desired carrier ratio. If, for example, the sound carrier rides too high on the selectivity curve of the I. F. amplifier, it may result in cross modulation of picture signal side bands and it will be impossible to eliminate dots from appearing in the picture.

In an effort to retain the advantages of the intercarrier system and to eliminate some of its disadvantages, the following system is proposed:

The picture carrier is permitted to go through its own I. F. amplifier, which I. F. amplifier is so shaped as to give optimum picture quality and performance without regard to the sound carrier position and amplitude, and to amplify the sound carrier at I. F. directly from the converter by means of a high gain 4.5 megacycle amplifier, and the 4.5 megacycle in this case is obtained by a second converter action in the output of the first converter tube. This could be accomplished by passing the sound I. F. carrier directly from the converter through a double tuned circuit to one grid of a converter tube (the desirability of a moderately broad band circuit will be treated later). To another or the same grid of the same second converter tube a signal is fed back from a point in the vicinity of the second detector of the receiver. This signal is the picture carrier and, in this case, the picture carrier will act as a second local oscillator. The difference frequency between these signals is again 4.5 megacycles, and the drift of the local oscillator again does not affect the difference frequency. The plate of the second converter tube will then go to a somewhat higher gain 4.5 megacycle I. F. amplifier than is normally used in an intercarrier set and subsequently to the usual F. M. demodulator. In this system drift of the local oscillator will simply result in a shifting about on the top of a double tuned or band-pass circuit response of the sound I. F. carrier. The picture carrier and its side bands can be treated for best quality picture without regard to sound. In this manner, the advantages of intercarrier television reception can be realized without the critical picture I. F. alignment normally required.

Figure 2:
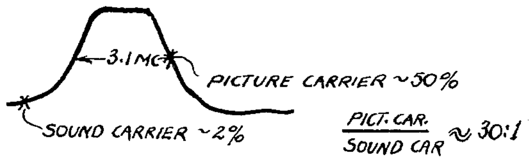
Figure 3:
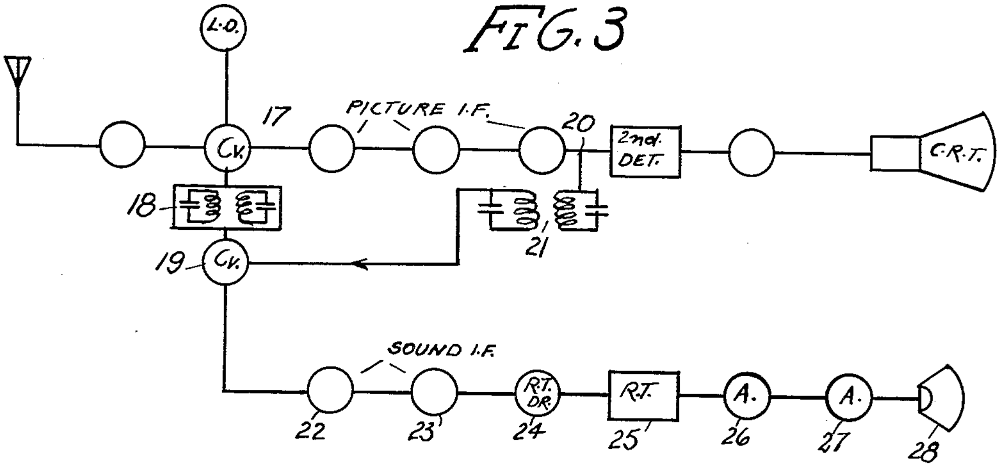

These and other objects of the invention will be more fully described with respect to the drawing annexed herewith, in which Figure 1 represents diagrammatically present practice in picture sound reception, Figure 2 a typical intermediate frequency response characteristic, and Figure 3 a circuit embodying certain features of the invention.

In Figure 1 the radio signals received by antenna 1 are fed into a radio frequency amplifier 2, which passes the signals on to a converter 3 to be mixed with the intercarrier waves of a local oscillator 4. The thus converted composite picture and sound signal is passed over intermediate frequency amplifiers 5, 6, and 7 to a second detector 8 and over a video amplifier 9 to a cathode ray tube or cinescope 10.

At point 11 of the circuit or in the output circuit of video amplifier 9, the signal or at least a portion thereof is fed into a ratio detector driver 12, the output of which is passed over ratio detector 13 and audio amplifiers 14 and 15 to a loudspeaker 16. A typical intermediate frequency response characteristic is indicated in Figure 2 for a standard intercarrier receiving set, the picture and sound carriers having the relation of approximately thirty to one.

In the circuit according to the invention, such as shown in Figure 3, which corresponds to Figure 1 except that the sound intermediate frequency carrier is passed directly from converter 17, which corresponds to converter 3 in Figure 1, over a double tuned circuit schematically indicated at 18 to a control electrode of a second converter 19 to be mixed with the picture intermediate frequency carrier which acts as a second source of local oscillation derived from point 20 and passed over a second double tuned circuit 21 to the same or another control electrode of converter 19.

The mixed signals are then passed from converter 19 to the sound intermediate frequency stages 22, 23, and from there to ratio detector driver 24, ratio detector 25, and audio amplifiers 26, 27, to loudspeaker 28. By this separation of picture and sound carriers, both can be handled independently for optimum quality of each of them and especially of picture reproduction; yet the drift-free, easy tuning characteristic of the intercarrier system are retained.

The invention is of course not limited to the circuits and circuit elements shown and the particular way of picture and sound carrier separation shown, but may be used with any other type of receiver or receiver circuit without exceeding the scope of the invention.

I claim:

1. In a cathode ray tube television receiver, a cascade of radio frequency amplifier, first detector, video intermediate frequency amplifier and video detector, all arranged in said cascade in the aforementioned order, means connected to the output of said first detector prior to said video intermediate frequency amplifier for separating from the combined picture and sound signals the sound intermediate frequency carrier, said connection and separation being effective to avoid cross modulation in said video intermediate frequency amplifier between said picture and sound signals; means for separating from the output of said video intermediate frequency amplifier, the picture intermediate frequency carrier for converting said sound intermediate frequency carrier into sound intermediate frequency signals, sound reproducing means controlled by said intermediate frequency signals, and picture reproducing means controlled by said video detector.

2. Combination according to claim 1 wherein said first separating means include a double tuned circuit forming a band pass filter and arranged in the path of signals derived from said frequency detector, and wherein said second separating means include another double tuned circuit forming a band pass filter and arranged in the path of signals derived from said video intermediate frequency.

References Cited in the file of this patent

UNITED STATES PATENTS

| | | |
|---|---|---|
| 2,448,908 | Parker | Sept. 7, 1948 |
| 2,505,843 | Smith | May 2, 1950 |
| 2,572,424 | Amos | Oct. 23, 1951 |